US012183505B2

(12) United States Patent
Topalov et al.

(10) Patent No.: US 12,183,505 B2
(45) Date of Patent: Dec. 31, 2024

(54) ELECTRICAL ROTARY TRANSFORMER FOR INDUCTIVE ENERGY TRANSMISSION

(71) Applicant: MAHLE International GmbH, Stuttgart (DE)

(72) Inventors: Penyo Topalov, Stuttgart (DE); Philipp Zimmerschied, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/705,521

(22) PCT Filed: Oct. 21, 2022

(86) PCT No.: PCT/EP2022/079426
§ 371 (c)(1),
(2) Date: Apr. 26, 2024

(87) PCT Pub. No.: WO2023/072768
PCT Pub. Date: May 4, 2023

(65) Prior Publication Data
US 2024/0331936 A1    Oct. 3, 2024

(30) Foreign Application Priority Data

Oct. 27, 2021    (DE) .......................... 102021212145.4

(51) Int. Cl.
*H01F 38/18*    (2006.01)
*H01F 27/24*    (2006.01)
(Continued)

(52) U.S. Cl.
CPC ............. *H01F 38/18* (2013.01); *H01F 27/24* (2013.01); *H01F 27/28* (2013.01); *H02K 1/12* (2013.01); *H02K 1/22* (2013.01)

(58) Field of Classification Search
CPC .... A61B 8/00; A61B 8/12; A61B 8/44; A61B 8/4461; H02K 1/12; H02K 1/22;
(Continued)

(56) References Cited

U.S. PATENT DOCUMENTS

| 4,558,320 A | 12/1985 | Pedrazza |
| 10,395,821 B2 * | 8/2019 | Hanabusa ............... H01F 38/14 |
| 2009/0163817 A1 * | 6/2009 | Masters ................... A61B 8/12 336/90 |

FOREIGN PATENT DOCUMENTS

| DE | 4407277 A1 * | 9/1994 |
| DE | 102013209216 A1 * | 11/2014 |

(Continued)

OTHER PUBLICATIONS

Raminosoa, Novel Rotary Transformer Topology with Improved Power Transfer Capability for High Speed Applications, IEEE Transactions on Industry Applications, Vo. 56, No. 1, Jan./Feb. 2020.

(Continued)

*Primary Examiner* — Tran N Nguyen
(74) *Attorney, Agent, or Firm* — Fishman Stewart PLLC

(57) ABSTRACT

An electrical rotary transformer for inductive energy transmission may include a rotary transformer stator, a rotary transformer rotor rotatable relative to the rotary transformer stator, and a capacitive coupler for capacitive electrical signal transmission between the rotary transformer stator and the rotary transformer rotor. The rotary transformer stator may include a primary coil. The rotary transformer rotor may include a secondary coil inductively couplable to the primary coil. The capacitive coupler may be partly formed on the rotary transformer stator and the rotary transformer rotor. The capacitive coupler may include two plate capacitors that may each include a first and a second plate element. The two first plate elements may be arranged (Continued)

Figure 3:
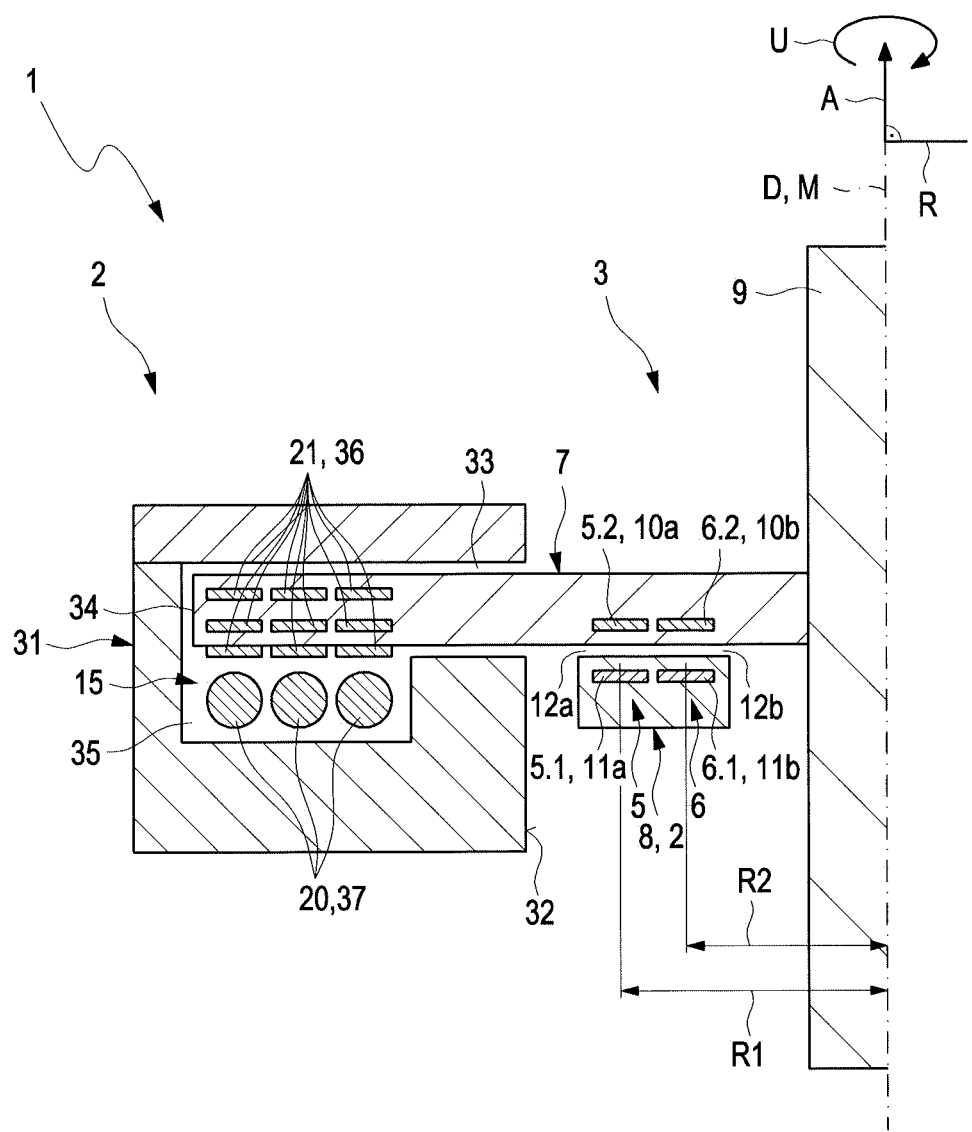

on the stator. The two second plate elements may be arranged on the rotary transformer rotor. The first plate element and the second plate element of each plate capacitor may be disposed opposite one another for capacitive coupling.

20 Claims, 3 Drawing Sheets

(51) Int. Cl.
*H01F 27/28* (2006.01)
*H02K 1/12* (2006.01)
*H02K 1/22* (2006.01)

(58) Field of Classification Search
CPC .. H02K 3/00; H02K 3/26; H02K 3/28; H02K 3/32; H01F 21/06; H01F 38/18; H01F 27/00; H01F 27/02; H01F 27/24; H01F 27/28; H01F 27/2804; H01F 27/34; H04B 5/26; H04B 5/72; H04B 5/79

See application file for complete search history.

(56) References Cited

FOREIGN PATENT DOCUMENTS

| DE | 202014101753 U1 | 7/2015 |
| DE | 202015101334 U1 | 6/2016 |
| EP | 0073903 A2 | 3/1983 |
| EP | 2869316 A1 | 5/2015 |
| EP | 2933655 A1 | 10/2015 |
| WO | 2021094564 A1 | 5/2021 |

OTHER PUBLICATIONS

English abstract for DE202015101334.
English abstract for DE202014101753.

* cited by examiner

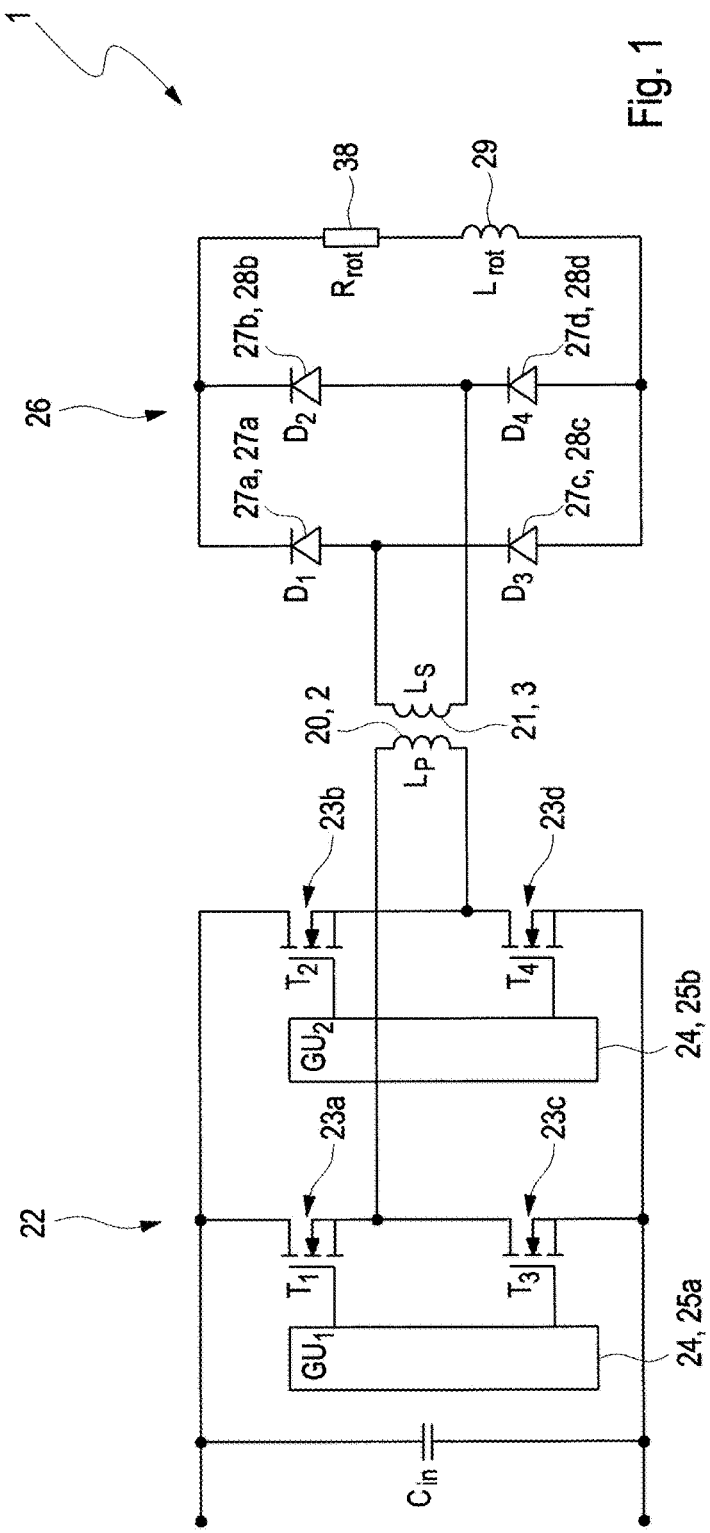
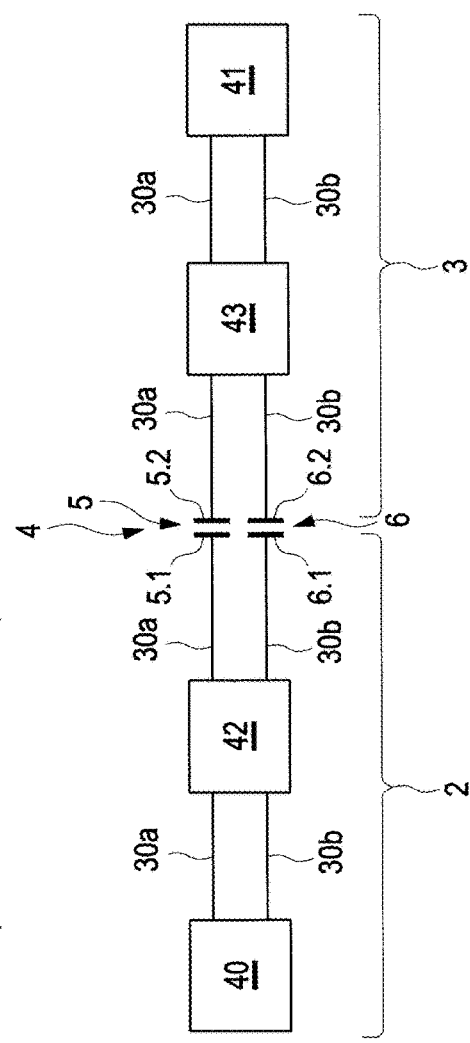
Fig. 1
Fig. 2

ELECTRICAL ROTARY TRANSFORMER FOR INDUCTIVE ENERGY TRANSMISSION

The invention relates to an electrical rotary transformer for inductive energy transmission as well as an externally excited electrical synchronous machine comprising such a rotary transformer.

So-called externally excited electrical synchronous machines require an electrical direct voltage in their rotary transformer rotor in order to generate the magnetic rotor field. This process is referred to as "rotor excitation".

The electrical energy transmission on the rotating rotary transformer rotor takes place inductively, thus wirelessly. As part of an externally excited synchronous machine, such a setup is referred to as "rotary transformer" or "rotating planar transformer".

The operating principle of said inductive energy transmission is based on an electrical transformer, wherein the primary winding or primary coil, respectively, of the transformer is arranged on the rotary transformer stator of the rotary transformer or of the synchronous machine, respectively, and the secondary winding or secondary coil, respectively, on the rotating rotary transformer rotor Due to the fact that an electrical alternating voltage is always generated during the inductive energy transmission in the secondary coil, it is necessary for supplying current to the electrical rotor to convert this alternating voltage into an electrical direct voltage.

For the operation of the electrical rotary transformer or an externally excited electrical synchronous machine equipped with this rotary transformer, respectively, it is often necessary to transmit data or at least signals from the primary side, thus from the stator, to the secondary side, thus to the rotor, or in reverse direction from the rotor to the stator or also in both directions.

It is an object of the present invention to show new ways during the development of rotary transformers. In particular, an improved embodiment for such a rotary transformer is to be created, which provides for a simple, but nonetheless efficient signal or data transmission, respectively, between primary side and secondary side, thus between stator and rotor.

This object is solved by means of the subject matter of the independent patent claims. Preferred embodiments are subject matter of the dependent patent claims.

It is therefore the basic idea of the present invention to equip an electrical rotary transformer with a capacitive coupling means, by means of which a contact-free signal transmission is made possible between the stator and the rotor, which can be rotated relative to the stator. This allows for the desired signal or data transmission, respectively, between the stationary primary side and the rotatable secondary side of the rotary transformer. Due to the fact that the signal or data transmission, respectively, takes place electrically separately from the inductive energy transmission, an interference of the capacitive signal transmission by means of electromagnetic influence is ruled out. The transmission in a capacitive way furthermore allows for a high data transmission rate in the case of a suitable configuration of the coupling means. Lastly, such a capacitive coupling means requires only little installation space and turns out to be resistant to interference and thus reliable even during long-term operation.

An electrical rotary transformer according to the invention for the inductive energy transmission, in particular for a traction motor of a vehicle, comprises a rotary transformer stator having a primary coil. The rotary transformer further comprises a rotary transformer rotor, which is formed so as to be capable of being rotated relative to the rotary transformer stator about an axis of rotation, and a rotary transformer rotor having a secondary coil. The secondary coil can be inductively coupled or is inductively coupled to the primary coil. According to the invention, the rotary transformer additionally comprises a capacitive coupling means for the capacitive signal transmission between the rotary transformer stator and the rotary transformer rotor. The capacitive coupling means is partly formed on the rotary transformer stator and partly on the rotary transformer rotor.

To generate and receive electrical signals, the rotary transformer can comprise an electrical sending and receiving unit, which is provided on the rotary transformer stator. To generate and receive electrical signals, the rotary transformer can further have an electrical sending and receiving unit, which is arranged on the rotary transformer rotor. For the signal transmission between both sending and receiving units, the rotary transformer can be expanded by a first and a second electrical conduction path, both of which—electrically separated from one another and in electrical parallel connection to one another—electrically connect both sending and receiving units to one another.

According to a preferred embodiment, the capacitive coupling means comprises a first plate capacitor and a second plate capacitor. Each of the two plate capacitors comprises a first plate element and a second plate element, which is arranged at a distance from the first plate element by forming an intermediate space. The air arranged in the intermediate space can act as dielectric. In the case of this embodiment, the two first plate elements are arranged on the stator and the two second plate elements on the rotary transformer rotor. Compared to the first plate elements, the second plate elements are thus formed to be capable of being rotated and are also galvanically separated from them.

For the capacitive coupling, a first plate element and a second plate element thereby in each case lie opposite one another, preferably axially. Each of the two first plate elements can thus be arranged axially at a very small distance from the respective assigned second plate element. The capacity of the plate capacitors will also be increased in this way. The capacitive coupling means furthermore requires only little installation space, in particular in the axial direction.

According to a preferred embodiment, the rotary transformer rotor has a secondary coil printed circuit board, which can be rotated about the axis of rotation with respect to the rotary transformer stator. The secondary coil is arranged on the secondary coil printed circuit board—axially facing the primary coil. The secondary coil is thereby formed by at least one conductor track, which is present on the secondary coil printed circuit board. In connection with the present invention, "arranged on the secondary coil printed circuit board" means that the at least one conductor track forming the secondary coil is arranged—in particular visibly—on the surface of the printed circuit board or is surrounded—in particular non-visibly—by the material of the secondary coil printed circuit board. A combination of both variations, as it can be used in particular in the case of multi-layer secondary coil printed circuit boards, is also comprised by the above wording.

The two second plate elements are each formed by at least one conductor track made of a metal, preferably of copper, which is formed on the secondary coil printed circuit board. In the entire connection with the present invention "arranged on the printed circuit board" means that the conductor tracks forming the plate elements are arranged—in particular visibly—on the surface of the printed circuit board or are surrounded—in particular non-visibly—by the material of the printed circuit board. A combination of both variations, as it can be used in particular in the case of multi-layer printed circuit boards, is also comprised by the above wording.

In a further preferred embodiment, however, the second plate elements can also be arranged on a separate printed circuit board, thus not with the secondary winding on a common printed circuit board. In a further alternative, the formation of the first or/and second plate elements can be formed as annular elements made of a metal or as plastic copper-plated onto the rotor, which revolve around the rotor shaft, if no secondary coil printed circuit board is provided.

The two second plate elements can preferably be arranged radially on the inside, and the secondary coil radially on the outside on the secondary coil printed circuit board, or vice versa. This variation can be produced particularly easily and is thus associated with low production costs because the secondary coil of the rotary transformer as well as the rotatable portion of the two plate capacitors in the form of the second plate elements are formed on the same printed circuit board. The construction of this embodiment is furthermore particularly compact.

According to an advantageous further development, the two plate capacitors are arranged at a distance from one another along a radial direction extending perpendicularly away from the axis of rotation. This variation requires particularly little installation space in the axial direction.

According to a further advantageous further development, the two first plate elements are arranged on at least one additional printed circuit board, which is arranged axially at a distance from the secondary coil printed circuit board. Such an additional printed circuit board can be produced technically relatively easily and the production thereof is thus cost-efficient. The secondary coil printed circuit board and the additional printed circuit board can furthermore be arranged axially close to one another. This is associated with a further savings of installation space along the axial direction. The capacity of the two plate capacitors can additionally be increased in this way. In the entire connection with the present invention, "arranged on the additional printed circuit board" means that the conductor tracks forming plate elements are arranged—in particular visibly—on the surface of the printed circuit board or are surrounded—in particular non-visibly—by the material of the printed circuit board. A combination of both variations, at it can in particular be used in the case of multi-layer printed circuit boards, is also comprised by the above wording.

Particularly expediently, the two first plate elements can each be formed by a conductor track made of a metal, preferably of copper, which is formed on the additional printed circuit board. This variation can also be produced particularly easily.

According to another preferred embodiment, the two plate capacitors are arranged next to one another in an axial direction extending along the axis of rotation. This embodiment variation has a particularly compact construction in the radial direction. In a further variation, the two plate capacitors can be arranged axially next to one another and radially offset from one another.

According to an advantageous further development, the two first plate elements are arranged on two different additional printed circuit boards. In the case of this further development, the secondary coil printed circuit board is arranged axially between the two additional printed circuit boards.

According to a further advantageous further development, the two second plate elements are arranged on axially opposite sides of the secondary coil printed circuit board. One of the two second plate elements thereby axially faces the first plate element arranged on the first additional printed circuit board. The other one of the two second plate elements axially faxes the first plate element arranged on the second additional printed circuit board. This further development also has a particularly compact axial construction and is furthermore characterized by a low electrical/electronic susceptibility to interference.

The two first and second plate elements can expediently each be formed rotationally symmetrically to the axis of rotation. It is ensured in this way that the functionality of the plate capacitors with respect to the transmission of electrical signals during the rotational movement of the rotary transformer rotor is ensured in each rotational position of the rotary transformer rotor relative to the rotary transformer stator.

Particularly advantageously, the first and second plate element of at least one plate capacitor, preferably of both plate capacitors, can thus each have an annular geometry. In this way, as described above, it can be ensured that the functionality of the plate capacitors with regard to the transmission of electrical signals is not reduced during the rotational movement of the rotor.

Particularly preferably, the first and second plate elements are arranged coaxially to one another with respect to the axis of rotation. This measure also ensures that the functionality of the plate capacitors is not reduced during the rotational movement of the rotor.

In the case of a preferred embodiment, a transformer core of a magnetic core material, preferably of a ferrite, is arranged on the rotary transformer stator. The course of the magnetic field lines can be improved by means of the transformer core and the efficiency of the rotary transformer can thus be improved during the energy transmission from the primary to the secondary side.

The transformer core preferably surrounds a coil receiving space, in which the primary coil and the secondary coil printed circuit board are arranged with the secondary coil. An arrangement of both coils in the coil receiving space effects that the primary coil and the secondary coil can be inductively coupled to one another in a particularly efficient manner.

Particularly advantageously, the transformer core can be formed in an annular manner and arranged coaxially to the axis of rotation. Particularly little installation space is thus required.

According to an advantageous further development, the transformer core has, on its inner circumference, a recess, which is open radially to the inside and in which the secondary coil printed circuit board is arranged with a radially outer printed circuit board section. The radially outer printed circuit board section having the secondary coil is surrounded by the transformer core in this way.

According to an advantageous further development, the recess can have an axial depression, in which the primary coil is received. The primary coil is also surrounded completely by the transformer coil in this way.

Due to the fact that the magnetic material of the transformer coil cannot develop an advantageous effect for the capacitive coupling means, the capacitive coupling means is to be arranged outside of the transformer core or of the coil receiving space, respectively, in accordance with the invention. Significant cost advantages can be attained due to the material for the transformer coil, which is saved in this way.

Particularly preferably, the primary coil and the secondary coil are arranged at a larger radial distance from the axis of rotation than the capacitive coupling means. This makes it possible to provide the transformer coil radially on the outside and to fasten it to the stationary, thus non-rotating stator of an electrical machine.

The invention further relates to an externally excited synchronous machine, in particular a traction motor for a vehicle. The synchronous machine comprises a synchronous machine stator, which can be electrically supplied with current, for generating a magnetic stator field. This machine further comprises a synchronous machine rotor, which can be electrically supplied with current and which is rotatable with respect to the synchronous machine stator, for generating a magnetic rotor field, which has a synchronous machine rotor shaft. The synchronous machine additionally comprises an above-introduced rotary transformer according to the invention, which is connected in a rotationally fixed manner to the synchronous machine rotor shaft. The above-introduced advantages of the rotary transformer according to the invention thus also transfer to the externally excited electrical synchronous machine according to the invention.

The synchronous machine can in particular be used in a motor vehicle, which can comprise a battery as energy source. The synchronous machine thereby in particular serves the purpose of driving the motor vehicle, is thus in particular formed as a traction motor. The traction motor according to the invention preferably has an output or drive power, respectively, of between 100 kW and 240 kW, in particular 140 kW.

Further important features and advantages of the invention follow from the subclaims, from the drawings and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

IN EACH CASE SCHEMATICALLY

Figure 4:
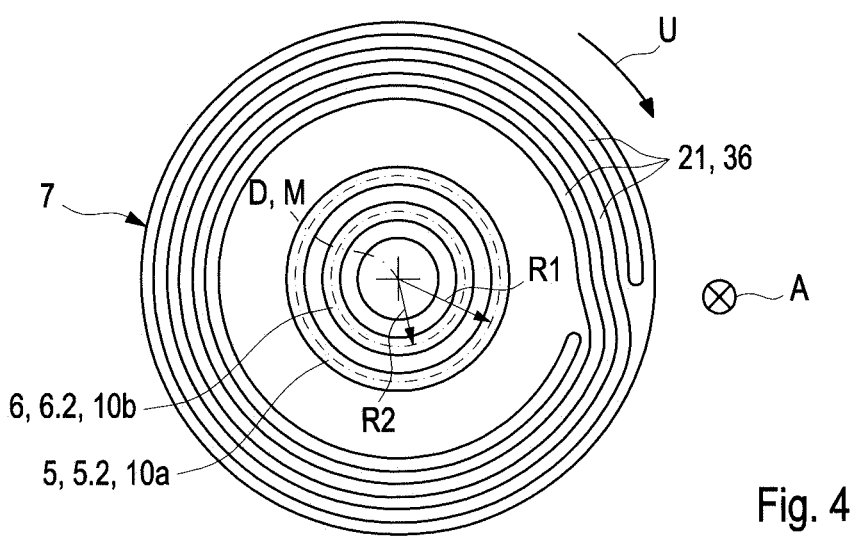
Figure 5:
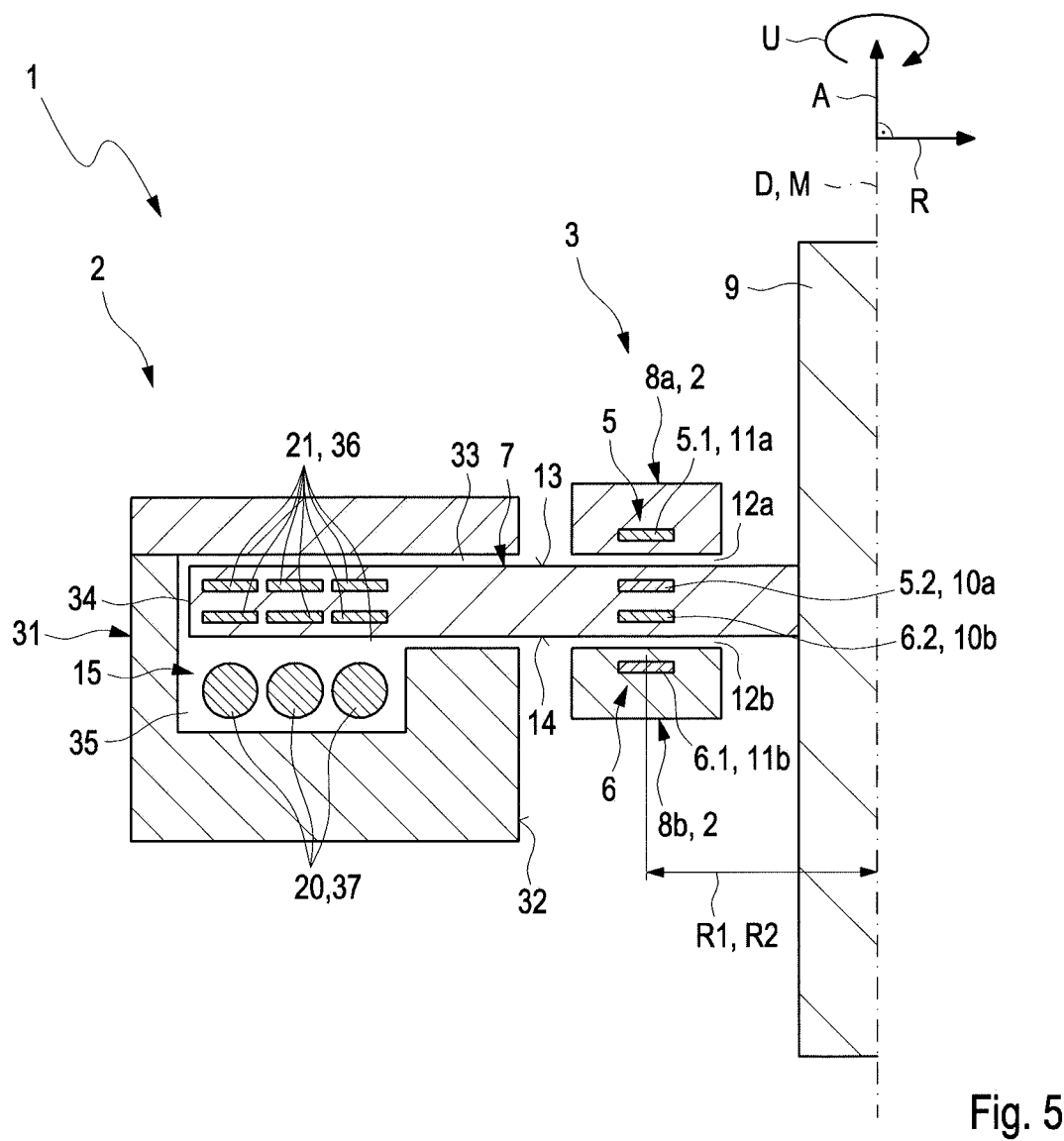
Figure 6:
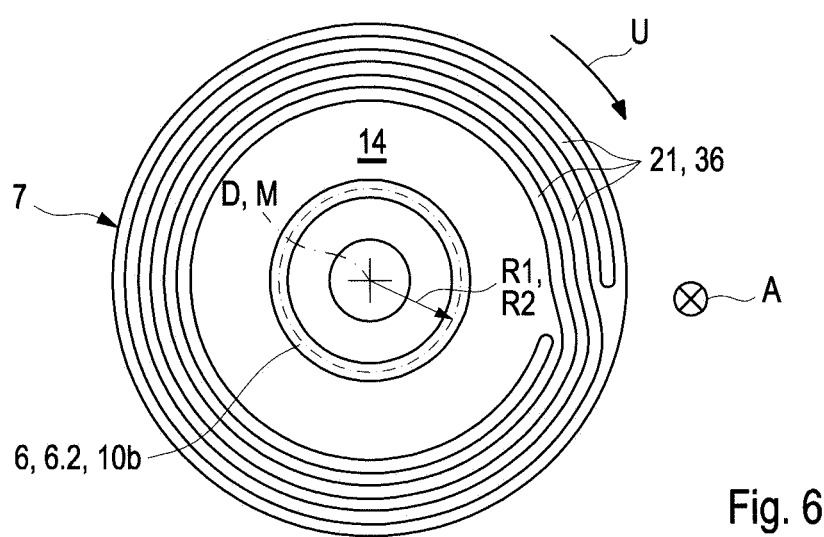

FIG. 1 shows the electrical wiring of an electrical rotary transformer according to the invention in circuit diagram-like illustration, FIG. 2 shows a diagram illustrating the functional setup of the capacitive coupling means, which is essential for the invention, FIG. 3 shows the mechanical setup of a first example of the rotary transformer according to the invention, in the case of which the plate capacitors of the capacitive coupling means are arranged radially next to one another, in a longitudinal section, FIG. 4 shows the rotary transformer of FIG. 3 in a top view onto the secondary coil printed circuit board, FIG. 5 shows the mechanical setup of a first example of the rotary transformer according to the invention, in the case of which the plate capacitors of the capacitive coupling means are arranged axially next to one another, in a longitudinal section, FIG. 6 shows the rotary transformer of FIG. 5 in a top view onto the secondary coil printed circuit board.

FIG. 1 shows the electrical wiring of an electrical rotary transformer 1 according to the invention for inductive energy transmission in a circuit diagram-like manner. The rotary transformer 1 can be used in an externally excited electrical synchronous machine, in particular in a traction motor for a vehicle. On the primary side, the rotary transformer 1 comprises a rotary transformer stator 2 comprising a primary coil 20. On the secondary side, the rotary transformer 1 further comprises a rotary transformer rotor 3, which is formed so as to be capable of being rotated relative to the rotary transformer stator 2 about an axis of rotation D (not shown in FIG. 1) and which has a secondary coil 21. The secondary coil 21 is inductively coupled to the primary coil 20.

For the electrical energy transmission from the primary coil 20 to the secondary coil 21, it is necessary to generate an electrical alternating current in the primary coil 20. The electrical alternating voltage required for this purpose can be generated by means of a transistor circuit 22, which is arranged on the primary side and which is electrically connected to the primary coil 20. The transistor circuit 22 can comprise four power transistors 23a, 23b, 23c, 23d, which, in the example, are controlled via a control means 24 comprising two integrated circuits 25a, 25b. In the case of electrical current supply to the primary coil 20 with an electrical alternating current, an electrical alternating voltage is also induced in the secondary coil 21. The secondary coil 21 is electrically connected to an electrical rectifier circuit rectifier circuit 26, which, in the example, comprises four rectifier elements 27a, 27b, 27c, 27d and by means of which the induced electrical alternating voltage can be converted into an electrical direct voltage. The four rectifier elements 27a-27d can each be formed by a rectifier diode 28a-28d. The electrical direct current generated in this way serves the purpose of electrically supplying current to the synchronous machine rotor of the electrical synchronous machine, which is suggested schematically in FIG. 1 by means of an inductor identified with reference numeral 29 and an ohmic resistor identified with reference numeral 38.

For the signal or data transmission, respectively, between the primary side and the secondary side, thus between the rotary transformer stator 2 and the rotatable rotary transformer rotor 3, the rotary transformer 1 comprises a capacitive coupling means 4. The setup of the capacitive coupling means 4 is shown in FIG. 2 in a circuit diagram-like manner. To send electrical signals to the rotary transformer rotor 3 and to receive electrical signals from the rotary transformer rotor 3, the rotary transformer 1 comprises an electrical sending and receiving unit 40, which is provided on the rotary transformer stator 2. To send electrical signals to the rotary transformer stator 2 and to receive electrical signals from the rotary transformer stator 2, the rotary transformer 1 comprises an electrical sending and receiving unit 41, which is provided on the rotary transformer rotor 3. For the signal transmission between the two sending and receiving units 40,41, the rotary transformer 1 comprises a first and a second electrical conduction path 30a, 30b, both of which—switched electrically parallel to one another—electrically connect the two sending and receiving units 40, 41 to one another. A first plate capacitor 5 of the coupling means 4 is arranged in the first conduction path 30a. A second plate capacitor 6 of the coupling means 4 is arranged in the second conduction path 30b. A galvanic separation of the sending and receiving unit 40 provided on the rotary transformer stator 2 from the sending and receiving unit 41 provided on the rotatable rotary transformer rotor 3 is realized by means of the two plate capacitors 5, 6.

The first plate capacitor 5 comprises a first plate element 5.1 and a second plate element 5.2. The second plate capacitor 6 comprises a second plate element 6.1 and a second plate element 6.2. The two first plate elements 5.1, 6.1 are arranged at a distance, thus by forming an intermediate space, from the respective assigned second plate element 5.2, 6.2. The air arranged in the intermediate space acts as dielectric of the respective plate capacitor 5, 6.

As additionally illustrated in FIG. 2, an electrical filter means 42 or 43, respectively, for filtering interferences from the electrical signals transmitted by means of the two electrical conduction paths 30*a*, 30*b* can be provided in both electrical conduction paths 30*a*, 30*b*, in each case between the sending and receiving unit 40 and the two plate capacitors 5, 6 as well as between the sending and receiving unit 41 and the two plate capacitors 5, 6.

FIG. 3 illustrates the mechanical setup of the rotary transformer 1 in the transition region of the stator 2 to the rotor 3 in a schematic, highly simplified illustration. In contrast to the rotary transformer stator 2, the rotary transformer rotor 3 is formed to be rotatable. The rotary transformer rotor 3 comprises a rotor shaft 9, which can be rotated about the axis of rotation D. A central longitudinal axis M of the rotor shaft 9 is identical to the axis of rotation D. An axial direction A extends along the central longitudinal axis M and thus also along the axis of rotation D. A radial direction R extends perpendicular to the axial direction A away from the central longitudinal axis M or axis of rotation D, respectively. A circumferential direction U extends perpendicular to the axial direction A and also perpendicular to the radial direction R and revolves around the central longitudinal axis M or around the axis of rotation D, respectively.

Compared to the rotary transformer stator 2, the rotary transformer rotor 3 comprises a secondary coil printed circuit board 7, which can be rotated about the axis of rotation D and which is connected in a rotationally fixed manner to the rotor shaft 9. A conductor track 36, which forms the secondary coil 21, is arranged on the secondary coil printed circuit board 7. The secondary coil 21 or the conductor track 36, respectively, is electrically connected to the rectifier circuit 26, which has already been described on the basis of FIG. 1 and which is likewise arranged on the secondary coil printed circuit board 7 (not shown in FIG. 3). In connection with the present invention, "arranged on the secondary coil printed circuit board 7" means that the at least one conductor track forming the secondary coil 21 is arranged—in particularly visibly—on the surface of the secondary coil printed circuit board 7 or is surrounded—in particular non-visibly—by the material of the secondary coil printed circuit board 7. A combination of both variations, as it can be used in particular in the case of multi-layer secondary coil printed circuit boards 7, is also comprised by the above wording.

A transformer coil 31 made of a magnetic core material, preferably of a ferrite, is arranged on the rotary transformer stator 2. The transformer coil 31 preferably surrounds a coil receiving space 15, in which the primary coil and the secondary coil printed circuit board 7 are arranged with the secondary coil 21. The transformer coil 31 of the rotary transformer stator 2 can be formed in an annular manner and can be arranged coaxially to the axis of rotation D. In the example of FIG. 3, the transformer coil 31 has, on its inner circumference 32, a recess 33, which is open radially to the inside. The secondary coil printed circuit board 7 is arranged in this recess 33 with a radially outer printed circuit board section 34, on which the secondary coil 21 is arranged. As shown in FIG. 3, the recess 33 can additionally have an axial depression 35 radially on the outside, in which the primary coil 20 of the rotary transformer stator 2 is arranged. The primary coil 20 is arranged in the recess 33 in a stationary manner to the transformer core 31 so that the primary coil 20 and the secondary coil 21 are located opposite one another along the axial direction A at a distance from one another. In the case of electrical current supply to the primary coil 20 with an alternating current, an electrical alternating voltage is induced in the secondary coil 21. The primary coil 20 can be formed by a coil winding 37 made of an electrically conductive winding wire.

In the exemplary scenario, the primary coil 20 and the secondary coil 21 are arranged at a larger radial distance from the axis of rotation D than the capacitive coupling means 4. The two plate capacitors 5, 6 are additionally arranged outside of the transformer core 31 or of the coil receiving space 15, respectively.

As can additionally be seen in FIG. 3, the two first plate elements 5.1, 6.1 of the two plate elements 5, 6 are arranged on the rotary transformer stator 2. The two second plate elements 5.2, 6.2 are arranged on the rotary transformer rotor 3.

Compared to the two first plate elements 5.1, 6.1, the two second plate elements 5.2, 6.2 are thus formed so as to be rotationally adjustable around the axis of rotation D. In the example of FIG. 3, the two plate capacitors 5, 6 are additionally arranged at a distance from one another along the radial direction R. The two first plate elements 5.1, 6.1 of the two plate capacitors 5, 6 are arranged on the rotary transformer stator 2. For the capacitive coupling, the first and the second plate element 5.1, 5.2 of the first plate capacitor 5 are arranged axially opposite and at a distance from one another. For the capacitive coupling, the first and the second plate element 6.1, 6.2 of the second plate capacitor 6 are likewise arranged axially opposite and axially at a distance from one another. Air is arranged as dielectric in an axial intermediate space 12*a* of the first plate capacitor 5, which is formed between the first plate element 5.1 and the second plate element 5.2 of the first plate capacitor 5. Air as dielectric is accordingly likewise arranged in an axial intermediate space 12*b* of the second plate capacitor 6, which is formed between the first plate element 6.1 and the second plate element 6.2 of the second plate capacitor 5.

FIG. 4 shows the rotary transformer 1 of FIG. 3 in an axial top view onto the secondary coil printed circuit board 7. The conductor track 36 forming the secondary coil 21 can be seen clearly. The conductor track 36 revolves spirally around the rotor shaft 9 in the circumferential direction U. As can be seen in FIG. 4, the two second plate elements 5.2, 6.2 are in each case formed by a conductor track 10*a*, 10*b* made of a metal, for example of copper, which is arranged on the secondary coil printed circuit board 7. In connection with the present invention, "arranged on the secondary coil printed circuit board 7" means that the conductor tracks 10*a*, 10*b* forming the plate elements 5.2, 6.2 are arranged—in particular visibly—on the surface of the printed circuit board or are surrounded—in particular non-visibly—by the material of the printed circuit board. A combination of both variations, as it can be used in particular in the case of multi-layer printed circuit boards, is also comprised by the above wording.

In the example of FIG. 4, the two plate capacitors 5, 6 are arranged radially on the inside and the secondary coil 21 radially on the outside on the secondary coil printed circuit board 7. The two second plate elements 5.2, 6.2 are in each case furthermore formed rotationally symmetrically to the axis of rotation D. The two second plate elements 5.2, 6.2 in each case likewise have an annular or circular geometry, respectively, and extend along the circumferential direction U. The second plate elements 5.2, 6.2 are additionally arranged to one another coaxially to the axis of rotation D. A radius R1 of the second plate element 5.2 of the first plate capacitor 5 from the axis of rotation D is larger than a radius R2 of the second plate element 6.2 of the second plate capacitor 6. Above descriptions relating to the geometry of the two second plate elements 5.2, 6.2 also apply mutatis mutandis for the two first plate elements 5.1, 6.1, which are not illustrated in FIG. 4, of the first or second plate capacitor 5, 6, respectively.

As graphically suggested in FIG. 3, the two first plate elements 5.1, 6.1 can be arranged on an additional printed circuit board 8, which, as part of the rotary transformer stator 2, is arranged in the axial direction A at a distance from the secondary coil printed circuit board 7. The two first plate elements 5.1, 6.1 are also in each case formed by a conductor track 11a, 11b made of a metal, preferably of copper, which is formed on the additional printed circuit board 8. In the entire connection with the present invention, "arranged on the additional printed circuit board" means that the conductor tracks forming the plate elements are arranged—in particular visibly—on the surface of the printed circuit board 8 or are surrounded—in particular non-visibly—by the material of the printed circuit board 8. A combination of both variations, as it can in be used in particular in the case of multi-layer printed circuit boards 8, is also comprised by the above wording.

FIG. 5 shows a variation of the example of FIG. 3. In the case of the so-called "coplanar" arrangement of FIG. 5, the two plate capacitors 5, 6 are arranged next to one another along the axial direction A and at the same radial distance R1, R2 from the axis of rotation D. In the example of FIG. 5, the two first plate elements 5.1, 6.1 of the two plate capacitors 5, 6 are arranged on two different additional printed circuit boards 8a, 8b of the stator 2. The secondary coil printed circuit board 7 is thereby arranged in the axial direction A between the two additional printed circuit boards 8a, 8b. The two second plate elements 5.2, 6.2 are additionally arranged on axially opposite sides 13, 14 of the secondary coil printed circuit board 7. The second plate element 5.2 of the first plate capacitor 5 is thereby arranged on a first side 13 of the secondary coil printed circuit board 7. The second plate element 6.2 of the second plate capacitor 6 is arranged on a second side 14 of the secondary oil printed circuit board 7 located axially opposite the first side 13. The second plate element 5.2 of the first plate capacitor 5 therefore axially faces the first plate element 5.1 arranged on the first additional printed circuit board 8a and lies axially opposite thereto. The second plate element 6.2 of the second plate capacitor 6 accordingly axially faces the first plate element 6.1 axially arranged on the second additional printed circuit board 8b and lies opposite thereto along the axial direction A.

FIG. 6 shows—analogously to FIG. 4—the rotary transformer of FIG. 5 in an axial top view onto the side 14 of the secondary coil printed circuit board 7. The secondary coil 21 is accordingly formed by a conductor track 36 provided on the secondary coil printed circuit board 7, which revolves spirally around the rotor shaft 9 in the circumferential direction U. As can be seen in FIG. 6, the two second plate elements 5.2, 6.2 are in each case formed by a conductor track 10a, 10b made of a metal, for example of copper, which is arranged on the secondary coil printed circuit board 7, wherein only the second plate element 6.2 of the second plate capacitor 6 can be seen in FIG. 6. The two first plate elements 5.1, 6.1 can also in each case be formed by a conductor track 11a, 11b made of a metal, for example of copper, which is arranged on the first additional printed circuit board 8a or on the second additional printed circuit board 8b, respectively (see FIG. 5).

In the example of FIGS. 5 and 6, the two first as well as second plate elements 5.1, 5.2, 6.1, 6.2 are in each case also formed rotationally symmetrically to the axis of rotation D. The first and second plate elements 5.1, 5.2, 6.1, 6.2 in each case likewise have an annular or circular geometry, respectively, and extend along the circumferential direction U. The first and second plate elements 5.1, 5.2, 6.1, 6.2 are additionally arranged to one another coaxially to the axis of rotation D. In the example of FIGS. 5 and 6, the radius R1 of the first and second plate element 5.1, 5.2 of the first plate capacitor 5 from the axis of rotation D equals the radius R2 of the first and second plate element 6.1, 6.2 of the second plate capacitor 6. In the example of FIG. 6, the two plate capacitors 5, 6 are arranged radially on the inside and the secondary coil 21 radially on the outside on the secondary coil printed circuit board 7, analogously to the example of FIG. 4.

The invention claimed is:

1. An electrical rotary transformer for inductive energy transmission, comprising:

a rotary transformer stator including a primary coil;

a rotary transformer rotor rotatable relative to the rotary transformer stator about an axis of rotation, the rotary transformer rotor including a secondary coil at least one of inductively coupled and inductively couplable to the primary coil;

a capacitive coupler for capacitive electrical signal transmission between the rotary transformer stator and the rotary transformer rotor, the capacitive coupler partly formed on the rotary transformer stator and partly formed on the rotary transformer rotor;

the capacitive coupler including a first plate capacitor and a second plate capacitor that each include a first plate element and a second plate element;

the two first plate elements arranged on the stator and the two second plate elements arranged on the rotary transformer rotor, the first plate element and the second plate element of each of the first plate capacitor and the second plate capacitor disposed opposite one another for capacitive coupling;

the rotary transformer rotor including a secondary coil printed circuit board that is rotatable about the axis of rotation with respect to the rotary transformer stator and on which the secondary coil is arranged, the secondary coil formed by at least one conductor track provided on the secondary coil printed circuit board;

the two second plate elements each formed by at least one conductor track composed of a metal and formed on the secondary coil printed circuit board;

the two first plate elements and the two second plate elements each having an annular geometry;

the two first plate elements and the two second plate elements arranged coaxially to one another;

a transformer core of a magnetic core material arranged on the rotary transformer stator;

the transformer core surrounding a coil receiving space in which the primary coil and the secondary coil printed circuit board are arranged with the secondary coil;

the transformer core formed annularly and coaxially to the axis of rotation;

the transformer core having an inner circumference and, on the inner circumference, a recess, the recess opening radially to an inside, the secondary coil printed circuit board arranged in the recess with a radially outer printed circuit board section on which the secondary coil is arranged;
the recess including an axial depression in which the primary coil is received;
wherein the capacitive coupler is arranged outside of at least one of the transformer core and the coil receiving space; and
wherein the primary coil and the secondary coil are arranged at a larger radial distance from the axis of rotation than the capacitive coupler.

2. The rotary transformer according to claim 1, wherein the two plate capacitors are arranged at a distance from one another along a radial direction extending perpendicularly away from the axis of rotation.

3. The rotary transformer according to claim 1, wherein the two first plate elements are arranged on an additional printed circuit board, which is arranged axially at a distance from the secondary coil printed circuit board.

4. The rotary transformer according to claim 3, wherein the two first plate elements are each formed by a conductor track composed of a metal and arranged on the additional printed circuit board.

5. The rotary transformer according to claim 1, wherein:
the two first plate elements are arranged on two different additional printed circuit boards; and
the secondary coil printed circuit board is arranged axially between the two additional printed circuit boards.

6. The rotary transformer according to claim 5, wherein the two second plate elements are arranged on axially opposite sides of the secondary coil printed circuit board such that one of the two second plate elements axially faces the first plate element arranged on a first additional printed circuit board of the two additional printed circuit boards, and the other one of the two second plate elements axially faces the first plate element arranged on a second additional printed circuit board of the two additional printed circuit boards.

7. The rotary transformer according to claim 1, wherein the first plate capacitor and the second plate capacitor are arranged next to one another along an axial direction extending along the axis of rotation.

8. The rotary transformer according to claim 1, wherein the two first plate elements and the two second plate elements are each formed rotationally symmetrically to the axis of rotation.

9. An externally excited electrical synchronous machine, comprising:
a synchronous machine stator, which is electrically suppliable with current, for providing a magnetic stator field;
a synchronous machine rotor, which is electrically suppliable with current and is rotatable with respect to the synchronous machine stator, for providing a magnetic rotor field, the synchronous machine rotor including a synchronous machine rotor shaft; and
an electrical rotary transformer according to claim 1, the rotary transformer connected in a rotationally fixed manner to the synchronous machine rotor shaft.

10. The externally excited electrical synchronous machine according to claim 9, wherein the two plate capacitors are arranged at a distance from one another along a radial direction extending perpendicularly away from the axis of rotation.

11. The externally excited electrical synchronous machine according to claim 9, wherein the two first plate elements are arranged on an additional printed circuit board, which is arranged axially at a distance from the secondary coil printed circuit board.

12. The externally excited electrical synchronous machine according to claim 11, wherein the two first plate elements are each formed by a conductor track composed of a metal and arranged on the additional printed circuit board.

13. The externally excited electrical synchronous machine according to claim 9, wherein:
the two first plate elements are arranged on two different additional printed circuit boards; and
the secondary coil printed circuit board is arranged axially between the two additional printed circuit boards.

14. The externally excited electrical synchronous machine according to claim 13, wherein the two second plate elements are arranged on axially opposite sides of the secondary coil printed circuit board such that one of the two second plate elements axially faces the first plate element arranged on a first additional printed circuit board of the two additional printed circuit boards, and the other one of the two second plate elements axially faces the first plate element arranged on a second additional printed circuit board of the two additional printed circuit boards.

15. The externally excited electrical synchronous machine according to claim 9, wherein the first plate capacitor and the second plate capacitor are arranged next to one another along an axial direction extending along the axis of rotation.

16. The externally excited electrical synchronous machine according to claim 9, wherein the two first plate elements and the two second plate elements are each formed rotationally symmetrically to the axis of rotation.

17. An electrical rotary transformer for inductive energy transmission, comprising:
a rotary transformer stator including a primary coil;
a rotary transformer rotor rotatable relative to the rotary transformer stator about an axis of rotation, the rotary transformer rotor including a secondary coil at least one of inductively coupled and inductively couplable to the primary coil;
a capacitive coupler for capacitive electrical signal transmission between the rotary transformer stator and the rotary transformer rotor, the capacitive coupler partly formed on the rotary transformer stator and partly formed on the rotary transformer rotor;
the capacitive coupler including a first plate capacitor and a second plate capacitor that each include a first plate element and a second plate element;
the two first plate elements arranged on the stator and the two second plate elements arranged on the rotary transformer rotor, the first plate element and the second plate element of each of the first plate capacitor and the second plate capacitor disposed opposite one another for capacitive coupling;
the rotary transformer rotor including a secondary coil printed circuit board that is rotatable about the axis of rotation with respect to the rotary transformer stator and on which the secondary coil is arranged, the secondary coil formed by at least one conductor track provided on the secondary coil printed circuit board;
the two second plate elements each formed by at least one conductor track composed of a metal and formed on the secondary coil printed circuit board;
the two first plate elements and the two second plate elements each having an annular geometry;

the two first plate elements and the two second plate elements arranged coaxially to one another;

a transformer core of a magnetic core material arranged on the rotary transformer stator;

the transformer core surrounding a coil receiving space in which the primary coil and the secondary coil printed circuit board are arranged with the secondary coil;

the transformer core formed annularly and coaxially to the axis of rotation;

the transformer core having an inner circumference and, on the inner circumference, a recess, the recess opening radially to an inside, the secondary coil printed circuit board arranged in the recess with a radially outer printed circuit board section on which the secondary coil is arranged;

the recess including an axial depression in which the primary coil is received;

wherein the capacitive coupler is arranged outside of at least one of the transformer core and the coil receiving space;

wherein the primary coil and the secondary coil are arranged at a larger radial distance from the axis of rotation than the capacitive coupler;

wherein the two plate capacitors are arranged at a distance from one another along a radial direction extending perpendicularly away from the axis of rotation; and wherein the two first plate elements and the two second plate elements are each formed rotationally symmetrically to the axis of rotation.

18. The rotary transformer according to claim 17, wherein:

the two first plate elements are arranged on an additional printed circuit board, which is arranged axially at a distance from the secondary coil printed circuit board; and the two first plate elements are each formed by a conductor track composed of a metal and arranged on the additional printed circuit board.

19. The rotary transformer according to claim 17, wherein:

the two first plate elements are arranged on two different additional printed circuit boards;

the secondary coil printed circuit board is arranged axially between the two additional printed circuit boards; and the two second plate elements are arranged on axially opposite sides of the secondary coil printed circuit board such that one of the two second plate elements axially faces the first plate element arranged on a first additional printed circuit board of the two additional printed circuit boards, and the other one of the two second plate elements axially faces the first plate element arranged on a second additional printed circuit board of the two additional printed circuit boards.

20. The rotary transformer according to claim 17, wherein the first plate capacitor and the second plate capacitor are arranged next to one another along an axial direction extending along the axis of rotation.

* * * * *